(12) United States Patent
Tryland

(10) Patent No.: US 6,964,096 B2
(45) Date of Patent: Nov. 15, 2005

(54) METHOD OF MANUFACTURING A STRUCTURAL MEMBER AND A MEMBER PROVIDED BY SUCH METHOD

(75) Inventor: Tore Tryland, Raufoss (NO)

(73) Assignee: Norsk Hydro ASA, Oslo (NO)

( * ) Notice: Subject to any disclaimer, the term of this patent is extended or adjusted under 35 U.S.C. 154(b) by 475 days.

(21) Appl. No.: 10/341,417

(22) Filed: Jan. 14, 2003

(65) Prior Publication Data

US 2003/0131645 A1    Jul. 17, 2003

(30) Foreign Application Priority Data

Jan. 16, 2002   (NO)   ................................. 20020234

(51) Int. Cl.$^7$ ............................................ B21D 53/88

(52) U.S. Cl. ............... 29/897.2; 29/897.3; 29/897.312; 29/897.35; 296/187.03; 296/181.7; 296/181.03; 72/370.11

(58) Field of Search ........................... 29/897.2, 897.3, 29/897.312, 513, 557, 897.35, 897.33; 296/181.7, 296/187.03, 181.03; 72/254, 256, 370.11; 293/102, 120; 52/735.1

(56) References Cited

U.S. PATENT DOCUMENTS

| | | | | |
|---|---|---|---|---|
| 1,595,564 A | * | 8/1926 | Neuhaus ....................... 285/416 |
| 5,412,860 A | * | 5/1995 | Miyauchi et al. ........... 29/527.1 |
| 6,192,584 B1 | * | 2/2001 | Gundlach et al. ........... 29/897.2 |
| 6,523,885 B2 | * | 2/2003 | Kroning et al. ......... 296/187.03 |
| 6,705,653 B2 | * | 3/2004 | Gotanda et al. ............. 293/132 |
| 6,811,212 B2 | * | 11/2004 | Kasuga ........................ 296/205 |
| 6,820,924 B2 | * | 11/2004 | Caliskan et al. ........ 296/187.03 |

* cited by examiner

*Primary Examiner*—David P. Bryant
*Assistant Examiner*—Stephen Kenny
(74) *Attorney, Agent, or Firm*—Wenderoth, Lind & Ponack, L.L.P.

(57) ABSTRACT

Method for manufacturing a structural member having a body portion (4) and at least one flanged terminal portion (22) comprising the steps of extruding a profile and making one or more lengthwise splits (8) in one end of said profile to obtain at least one foldable portion (7). The portion (7) is folded into a position whereby the flanged terminal portion (22) is obtained.

A structural member having a body portion (4) and at least one flanged terminal portion (22), comprising an extruded profile with one or more lengthwise splits (8) in one end of said profile and thereby at least one foldable portion (7) which is folded in a position whereby a flanged terminal portion (22) is obtained.

17 Claims, 4 Drawing Sheets

METHOD OF MANUFACTURING A STRUCTURAL MEMBER AND A MEMBER PROVIDED BY SUCH METHOD

The present invention relates to a method for manufacturing a structural member, especially a vehicle assembly member serving to absorb collision energy and forces by direct or indirect collision impact. The invention also relates to a member provided by the method.

To protect persons in a motor vehicle against injury as a result of an impact by the motor vehicle against an object or the impact from another motor vehicle, it is common practice to provide an impact absorbing member between the bumper beam of the vehicle and the chassis or support frame thereof.

During an accident involving an impact, it is generally desirable and advantageous that the vehicle reduces its speed over the entire collision process to minimise the danger to persons within the vehicle. In other words, the process of impact absorption should be substantially continuous over the entire collision. This means that the deformation resistance from the beginning of the collision should be as high as possible to allow the greatest deformation work to be required from the inception of the collision.

This again means that a substantially constant resistance force should be provided against the force of the collision and in part the impact absorbing member interposed between the bumper beam and the vehicle chassis supplies this function. There are various bumper supports which, in part by their deformation work, serve to maintain a constant force.

State of the art impact absorbing members, e.g. crash boxes, can be made out of different materials and figures and in a number of different design models. Due to their light weight, high ductility and formability, light metals such as aluminium are suitable materials when constructing impact absorbing members for vehicles.

Impact absorbing members may comprise extruded parts. The production thereof may become a complicated operation. WO 98/14285 describes a method for manufacturing structural members such as crash boxes. Starting with a pre-extruded metal blank or profile a method is described for cutting and bending the blank into a collision impact absorber.

The blank described in the publication consists of a yoke forming the end plate and one or more leg portions. The leg portions are partly cut free from the end plate, thereby forming free surfaces. These free surfaces are then bent in order to form a hollow box. The edges of the bent surfaces will meet and can subsequently be attached to each other.

Due to this method it is possible to regulate the wall thickness lengthways in the crash box, but the possibilities to include ribs or in other ways to vary the cross section of the box are limited by the direction of the extrusion and the fact that the leg portions must be bent in order to form the final structural member. The length of the leg portions is also limited by the size of the extrusion die, which limits the length of the crash box.

Furthermore, there might be limitations in the ability of absorbing energy through the crash box as the stress flow through the box portion will be led perpendicular onto the end plate. This can lead to high stress concentrations in the contact area between the box portion and the end plate which might lead to unwanted deformation behaviour in the transition zone between the crash box and vehicle frame.

DE 197 51 513 A1 shows a method of forming an impact absorbing member from a longitudinally welded hollow profile. A crash box made according to this method will have the same limitations in stress flow as the above described publication.

It is an object of the present invention to provide a more flexible method of forming a structural member, e.g. a crash box formed as an impact absorbing member. The method makes it possible to vary the length of the member and makes it possible to include e.g. extra inner walls, ribs or flanges.

It is also an object of the invention to present an impact absorbing member having improved abilities of stress flow through the impact absorbing member and further into the vehicle.

To achieve this, a metal blank provided with longitudinal flanges is extruded parallel to the axis of the box length to be made of the metal blank. A precalculated part of each of the longitudinal flanges is cut free from the main body and bent into a desired shape to partly form the end plate. The longitudinal flanges may have increased wall thickness to form a strong transition zone between the crash box body and vehicle frame.

The invention will now be described by means of examples and figures, where

Figure 1:
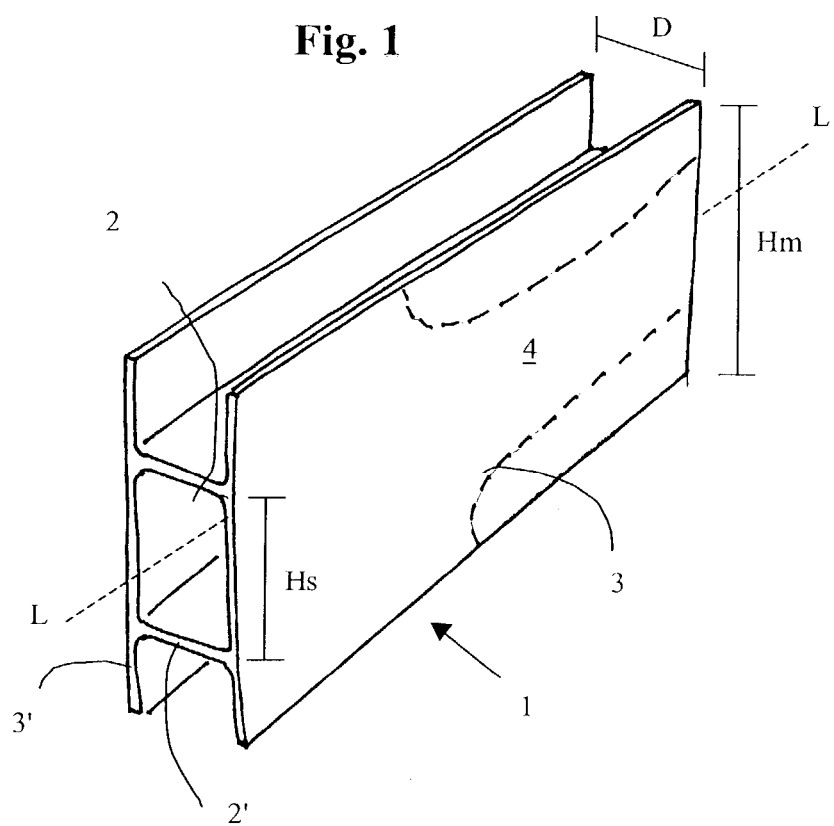
FIG. 1 shows a metal blank as extruded.

The metal blank 1 shown in FIG. 1 is extruded into profiled lengths. The metal blank in the example is formed to a hollow profile provided with four longitudinal flanges. The length of the extruded profile is defined by the size of the billet and will exceed what is necessary to form a crash box. The extruded profile is therefore cut into the lengths desired to form the final crash box.

Figure 5:
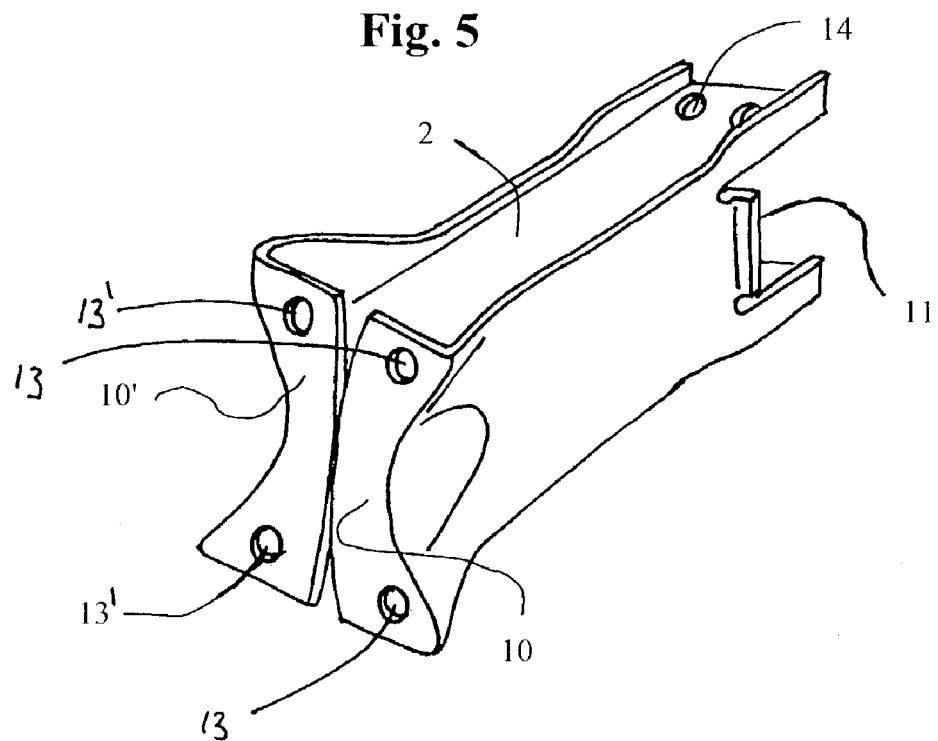
FIG. 5 shows the metal blank as in FIG. 4 with holes for fastening.
Figure 6:
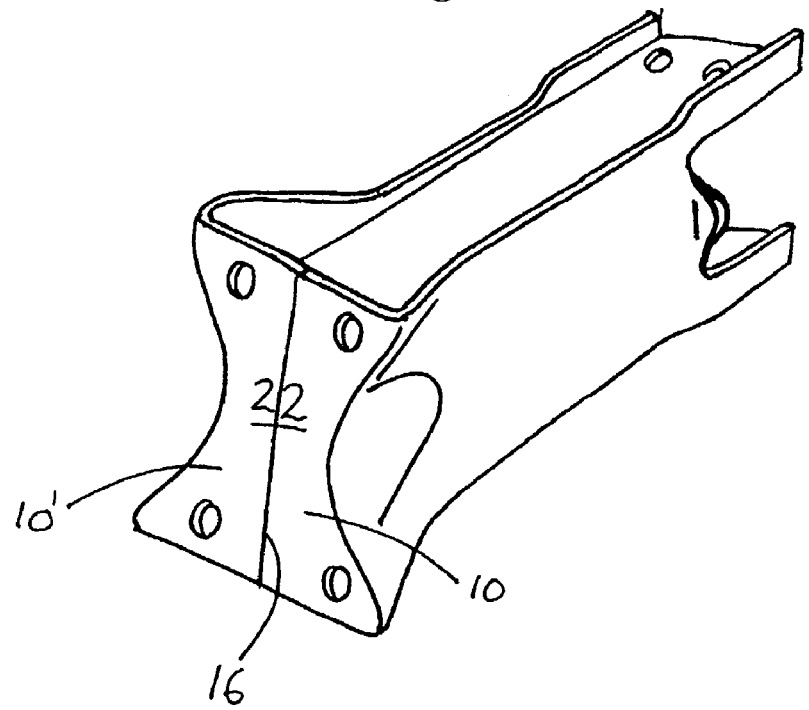
FIG. 6 shows the metal blank formed as a first embodiment of a crash box with end plates and attachment flanges in their final position.

The shape of the side walls 2, 2' and the main walls 3, 3' determine the cross section of the body portion 4 along the axis L of the final crash box as shown in FIG. 6. If desired, it is possible to form extra ribs or other modifications of the cross section of the metal blank 1 in the extruding process. Such modifications of the cross section of the profile will normally be parallel with the direction of the extrusion and thereby of the axis L—L. The height of the main walls 3, 3', Hm, will decide the width of the final end plate. The distance D between the two main walls 3, 3' and the height between the two side walls 2, 2', Hs, will define the volume of the body portion 4 of the crash box. This is also shown on FIGS. 5 and 6.

Figure 2:
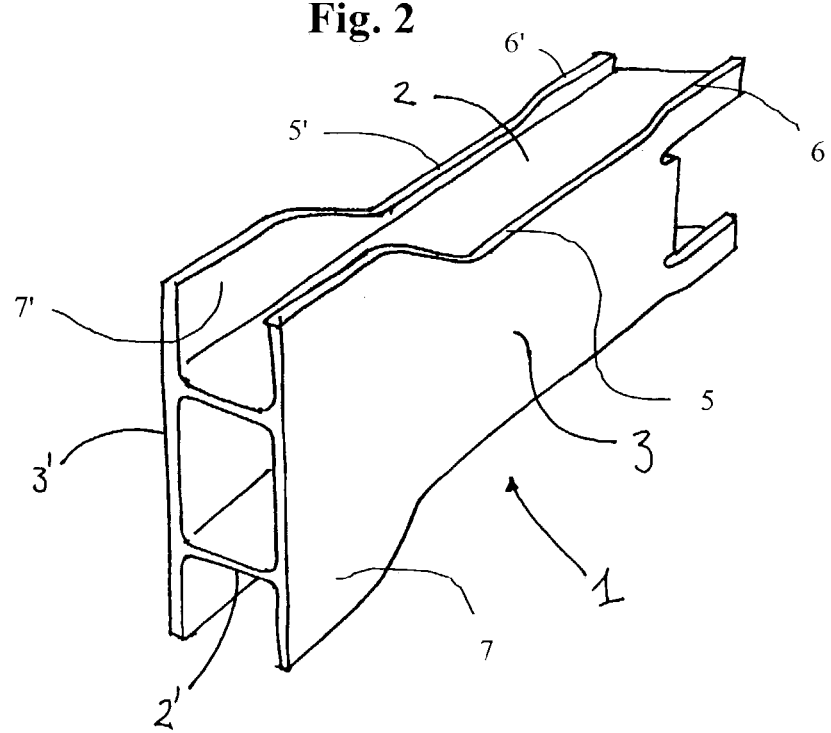
FIG. 2 shows the metal blank after a first cutting operation.

After a first cutting operation, the metal blank will have a form as shown in FIG. 2. The longitudinal flanges 5, 5' are cut lengthwise on the metal blank by leaving a precalculated part of the main walls 3, 3' passing over the side walls 2, 2'. The flanges 5, 5' serve as means for reinforcing the crash box and leading it to deform as close as possible to a predetermined path.

Holes, e.g. for fastening the final crash box and other machining operations, can be performed later in the process in order to form the end area. This is desired for adapting the final crash box to fit into its surroundings in a vehicle. These holes and cuttings can weaken the construction, thereby reducing its stability and its ability to deform in a controlled manner. The flanges are therefore extended around the critical zones of the side walls 2, 2' forming rims 6, 6'. The rims 6, 6' will stabilise the end area of the crash box. At the opposite end of the metal blank 1, sections 7, 7' are left in their original width. The sections 7, 7' will later in the process form the flanged terminal portion 22 of the crash box.

Figure 3:
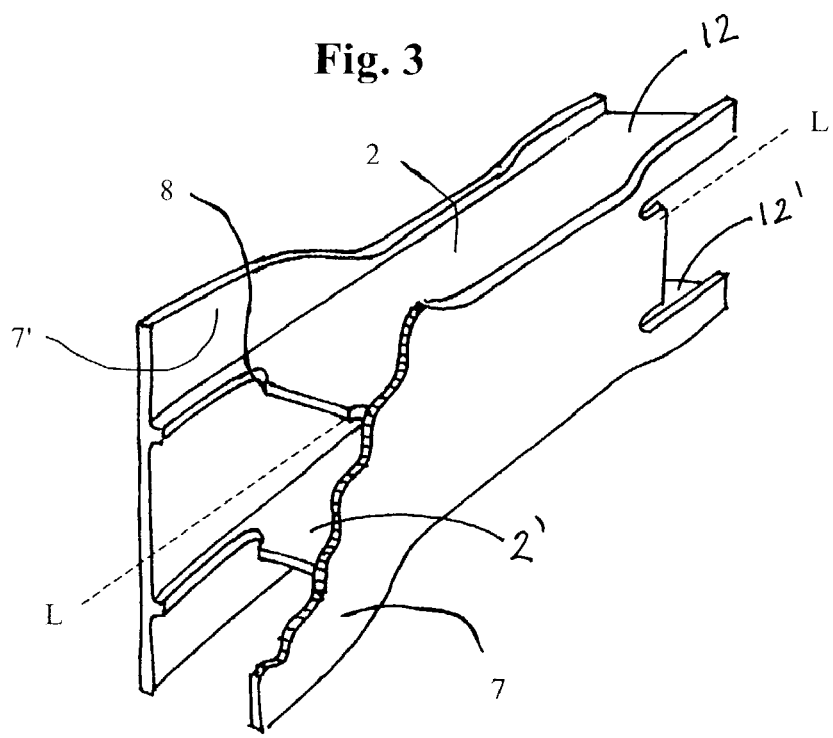
FIG. 3 shows the metal blank where the side walls are cut free and parts of the internal walls are removed.

In FIG. 3 it is shown how splits 8 are made in the metal blank leaving sections 7, 7' in a free position. The splits 8 enable the two sections 7, 7' to be bent out into the two halves which will form the end plates 10, 10' as shown on FIG. 4. Parts of the inner walls 2, 2' may obstruct the forming procedure. These parts are cut away leaving room for the flanged terminal portion 22 to be formed.

Figure 4:
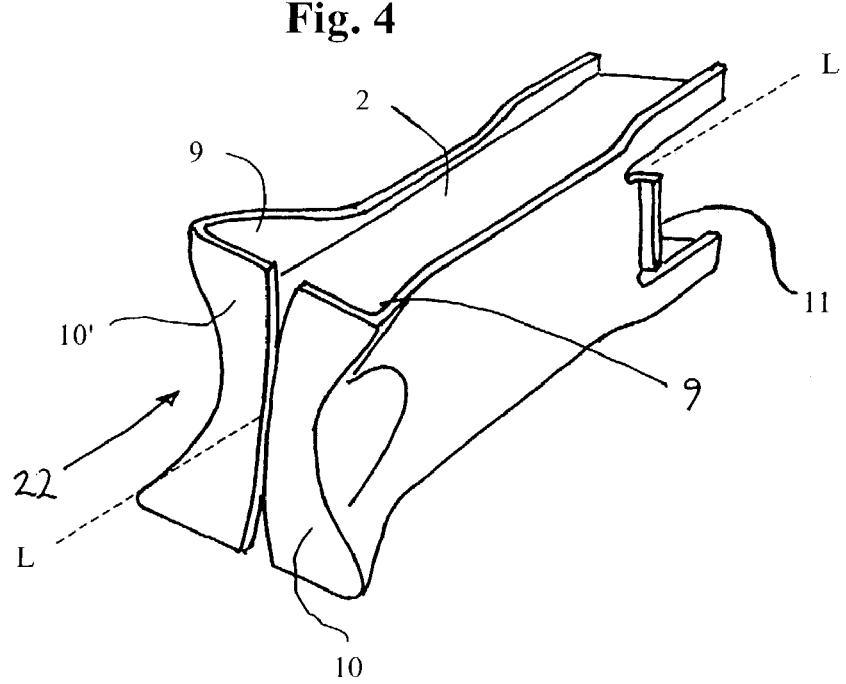
FIG. 4 shows the metal blank with end plates and attachment flanges bent into their final position.

The first steps of the bending procedure are shown in FIG. 4. A part of the rear structure of the crash box is cut away to free the wings 12, 12' (FIG. 3), whereafter an edge 11 on each side of the crash box is formed.

The sections 7, 7' (FIG. 3) of the metal blank 1 are bent outwards and then perpendicular to the length axis L of the metal blank thereby forming a flanged terminal portion 22. The sections 7, 7' will thereby form extra rims 9, 9'. This enables the impact forces to flow from the main walls 3, 3' through the end plates 10, 10' and further into the vehicle structure.

When forces are led through the end plate instead of perpendicularly onto it, the ability to absorb energy will increase. The end plates 10, 10' forming the flanged terminal portion 22 will remain stable and the deformation is concentrated in the crash box body. The side walls 2, 2' may lie in firm abutment with the back side of the endplates, or alternatively be terminated in a manner leaving space between their ends and the end plates.

On FIG. 5 plate holes 13, 13' and attachment holes 14 are shown. These are made to enable the crash box to be secured to its surroundings. The edge 11 is bent out to its final position. During the forming process, the end plates 10, 10' are also bent into position but an adjustment to get a tight connection between the first end plate 10 and the second end plate 10' might be required. The last process step is thus to form the end plates into their final position and trim the edge 11.

FIG. 6 shows a crash box as it can be after the forming operations. Optionally the sections 7, 7' (FIG. 3) forming the end plates 10, 10' may be welded together in the contact line 16 thereby forming the flanged terminal portion 22. The holes will enable the crash box to be fixed to its surrounding structure.

Figure 7:
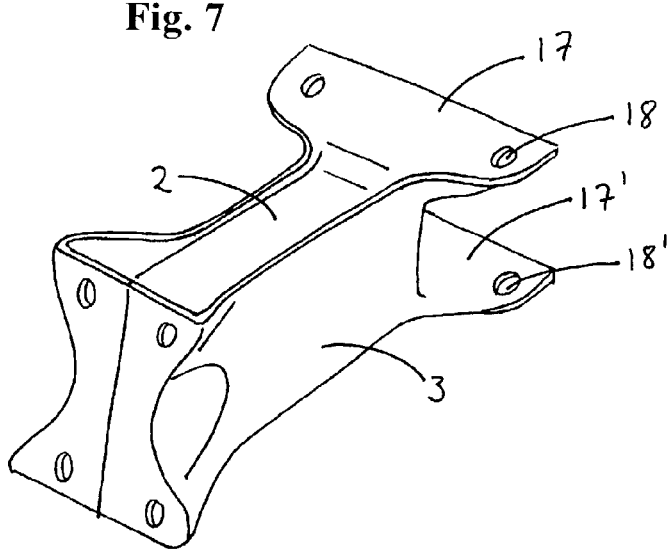
FIG. 7 shows a second embodiment of a crash box.

FIG. 7 shows a second embodiment of the invention. Instead of cutting away the rear part of the main walls 3, 3' for the forming of rims (6, 6' on FIG. 2), rear flanges 17, 17' are formed without extensive machining operations in the side walls 2, 2' and main walls 3, 3'. The upper and lower free parts of the main walls are bent out to form rear flanges 17, 17'. On the rear flanges, holes 18, 18' are made to simplify the fastening of the crash box. The rear flanges 17, 17' eases the fastening of the crash box to a cross member in a vehicle structure.

Figure 8:
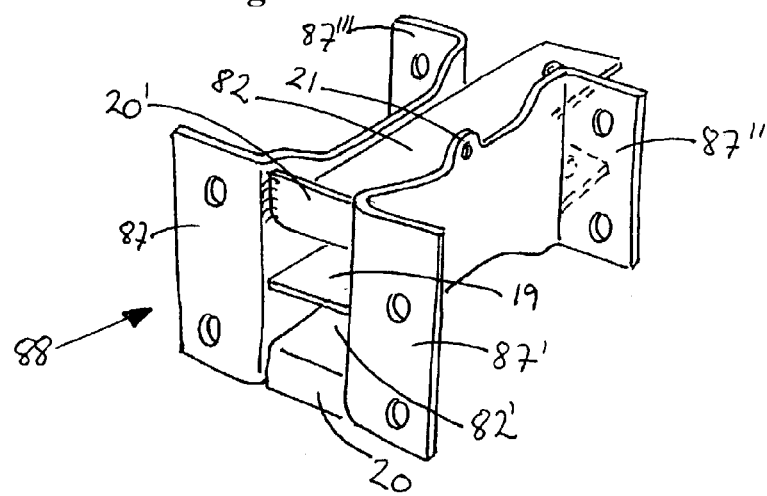
FIG. 8 shows a third embodiment of a crash box.

FIG. 8 shows a third embodiment of the invention. As can be seen in the figures, an additional inner wall 19 is formed in the extrusion process. In a first cutting operation, the main walls 83, 83' and side walls 82, 82' are cut free on the front and rear part of the metal blank leaving free sections 87, 87', 87", 87''' on both ends of the metal blank. The part of the inner wall 19 exceeding out from the front of the crash box body is cut away. The sections 87, 87' are bent outwards forming two separate end plates. The end parts of the side walls 82, 82' are bent outwards forming inner plates 20, 20' parallel to the sections 87, 87'. The inner plates 20, 20' can be welded to the main walls. The bent sections 87, 87' and the inner plates 20, 20' will together form a flanged terminal portion 88.

The rear sections 87", 87''' are bent out perpendicular to the length axis of the crash box forming separate end plates parallel to the front end plates formed by the sections 87, 87'. The rear free parts of the side walls 82, 82' are left unprocessed. Holes are made in the structure where this is convenient. Optionally, a protrusion 21 can be formed in the flanges during the cutting procedure leaving material for extra holes for fastening purposes.

Figure 9:
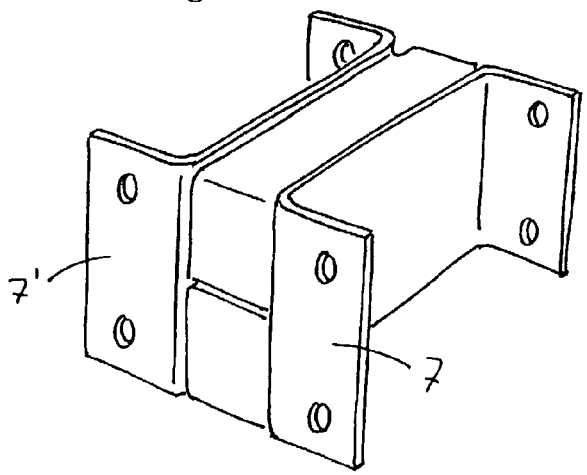
FIG. 9 shows a fourth embodiment of a crash box.

FIG. 9 shows a fourth embodiment of the invention. A cutting operation similar to the one needed for the third embodiment shown on FIG. 8 is performed. If there are any inner walls, exceeding parts of these are cut away. Thereafter the sections 87, 87', 87", 87''' are bent outwards. The free frontal parts of the side walls 82, 82' are bent inwards forming a part of the end plate of the final crash box. The free rear parts of the side walls 82, 82' are bent inwards in the same way (not shown) or can be cut away if this is found more appropriate.

The process according to the invention can also be used to form other embodiments of the structural member within the scope of the invention. By forming the structural member from a work piece defining the length axis of the structural member, a high degree of freedom is obtained on how to form the cross section and the end parts of the structural member. The method also improves the ability to control the stress flow through the extruded member.

The production method also makes it possible to alternate the length of the structural member. When used as crash boxes, this gives a possibility to regulate the size of the front of a vehicle by stretching out the crash boxes. The production method thereby enables the use of more standardised parts in various models of vehicles. Regulating the length of the crash boxes will not cause any production problems in the described method.

Another advantage of the production method is the ability to form extra ribs, side walls and flanges lengthwise on the structural member such as in a crash box body. This will leave the crash box constructor a high degree of freedom when forming the final shape of the crash box.

Since the structural member is made out of one single metal blank the production cost can be reduced. The cutting and bending procedure is made fully automatically. This gives an effective and thereby cost effective production method.

What is claimed is:

1. Method for manufacturing a structural member having a body portion (4) and at least one flanged terminal portion (22) comprising the steps of extruding a profile and making one or more lengthwise splits (8) in one end of said profile to obtain at least one foldable section (7), where said at least one section (7) is folded into a position whereby the flanged terminal portion (22) is obtained, characterised in that the profile is provided with one or more longitudinal flanges (5, 5') whereby a section of the flanges together with a section of a corresponding wall (2, 2', 3, 3') is formed into the terminal portion (22).

2. Method according to claim 1, characterised in that
the extruded profile is cut in a precalculated length prerequisite for the length of the final structural member.

3. Method according to claim 1, characterised in that
excessive material of the profile is removed to define the final geometrical shape of the body portion (4) of the structural member before splitting.

4. Method according to claim 1, characterised by
preparing for folding after splitting is done by removal of any obstructing material.

5. Method according to claim 4, characterised in that
the removal is done by cutting.

6. Method according to claim 4, characterised in that
the removal is done by bending.

7. Method according to claim 1, characterised in that
said at least one folded section (7) is fixed in position by means of welding.

8. Method according to claim 1, characterised by
two foldable sections (7, 7') where said sections are folded into a position whereby the flanged terminal portion (22) is obtained.

9. Method according to claim 8, characterised in that
said folded sections (7, 7') are secured mutually by means of welding.

10. Structural member having a body portion (4) and at least one flanged terminal portion (22), comprising an extruded profile with one or more lengthwise splits (8) in one end of said profile and thereby forming at least one foldable section (7) where said foldable section (7) is folded in a position whereby the flanged terminal portion (22) is obtained, characterised in that
the profile is provided with at least one longitudinal flange (5, 5') forming an extension of a corresponding wall (2, 2', 3, 3') whereby the foldable section (7) comprises an end part of said flange and said wall.

11. Structural member according to claim 10, characterised in that
the extruded profile is cut in a precalculated length prerequisite for the length of the final structural member.

12. Structural member according to claim 10, characterised in that
removal of excessive material defines the final geometrical shape of the body portion (4).

13. Structural member according to claim 10, characterised in that
at least one folded section (7) is welded to the body portion (4).

14. Structural member according to claim 10, characterised in that
the flanged terminal portion (22) consists of at least two foldable sections (7, 7') folded into an appropriate position.

15. Structural member according to claim 14, characterised in that
said foldable sections (7, 7') are mutually fixed by welding.

16. Structural member according to claim 10, characterised in that
both end parts of the body portion (4) are processed to their final shape.

17. Structural member according to claim 10, characterised in that
the direction of the extrusion of the extruded profile is the same as the lengthwise direction of the processed structural member.

* * * * *